(No Model.)
V. ROYLE.
PHOTOGRAPHIC SHUTTER.
No. 568,102. Patented Sept. 22, 1896.
Fig. 1.
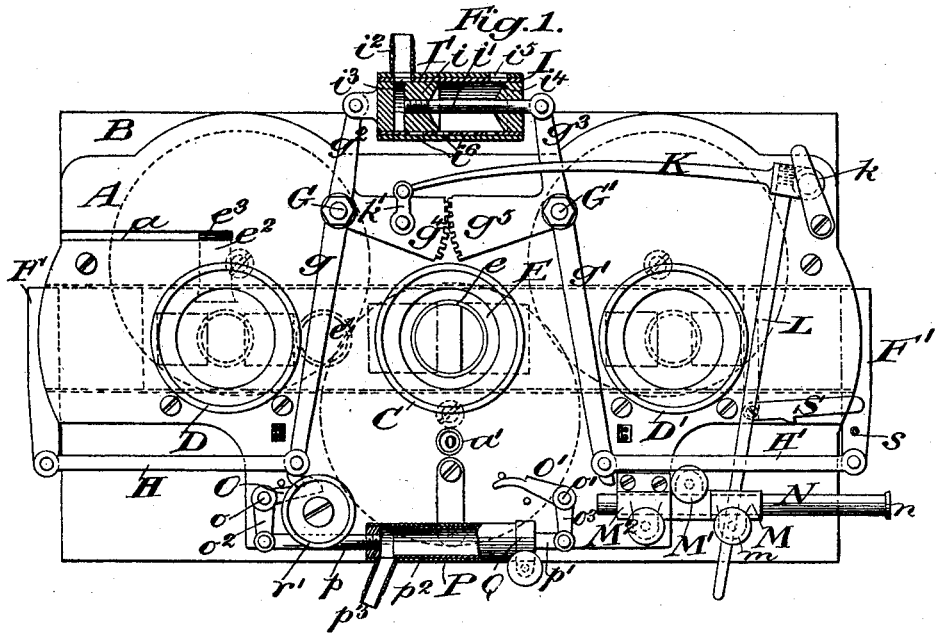
Fig. 2.
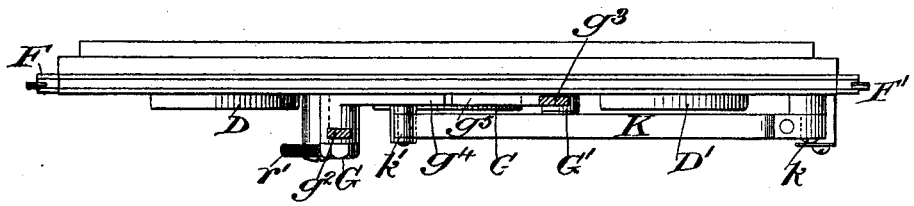
Fig. 3.
Fig. 4.
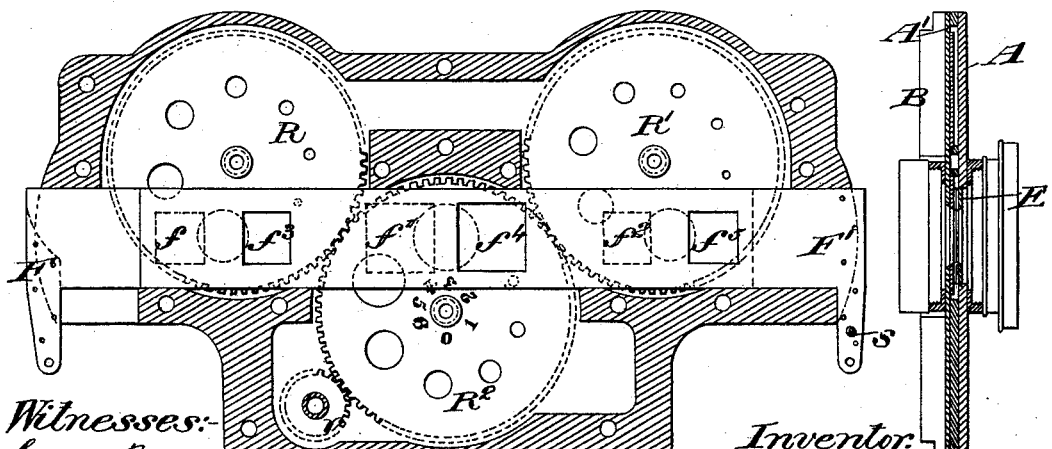
Witnesses:
George Barry.
R. B. Swan.
Inventor:
Vernon Royle.
by attorneys
Brown & Seward
THE NORRIS PETERS CO., PHOTO-LITHO., WASHINGTON, D. C.

UNITED STATES PATENT OFFICE.

VERNON ROYLE, OF PATERSON, NEW JERSEY.

PHOTOGRAPHIC SHUTTER.

SPECIFICATION forming part of Letters Patent No. 568,102, dated September 22, 1896.

Application filed September 8, 1894. Serial No. 522,466. (No model.)

*To all whom it may concern:*

Be it known that I, VERNON ROYLE, of Paterson, in the county of Passaic and State of New Jersey, have invented a new and useful Improvement in Photographic Shutters, of which the following is a specification.

My invention relates to an improvement in the lens-holding plate and its appurtenances by means of which both a single photographic lens and two lenses for stereoscopic purposes are mounted upon a single support and either one adapted to be brought into or thrown out of operation at the pleasure of the operator.

A practical embodiment of my invention is represented in the accompanying drawings, in which—

Figure 1 is a view in front elevation, partly in section, of the lens-holding plate and the operating mechanism in connection therewith. Fig. 2 is a top edge view, the combined dash-pot and operating-cylinder at the upper edge being removed. Fig. 3 is a view in front elevation with the face-plate and parts supported thereon removed, showing the position of the diaphragms and sliding plates for making exposures; and Fig. 4 is a view in transverse vertical section taken centrally through the plate, the operating cylinders and levers being omitted.

The front plate A is secured to a backing B, of wood or other suitable material, of such size and shape as to be readily inserted in and removed from the camera-box. The camera-box is not shown in the accompanying drawings, as it forms no part of my present invention. Through suitable openings in the front plate A and back plate B, I insert the front and rear lenses as follows:

The front and rear cells of a photographic lens of any well-known or approved form are inserted in the present instance centrally of the front and back plates A and B, as noted at C, and at suitable distances upon the opposite sides of the central photographic lens C, I locate a pair of stereoscopic lenses D and D'. For purposes of my present invention I locate the three lenses with their centers on the same line and provide for bringing either the photographic lens or the pair of stereoscopic lenses into action as follows:

A sliding plate or strip of thin material E is fitted to slide longitudinally along within a shallow recess in the under side of the front plate A and is provided with two openings through it, one denoted by $e$ and the other by $e'$, the opening $e$ being intended to admit light through the photographic lens and the opening $e'$ to admit light through one of the sets of stereoscopic lenses. The length of the sliding plate E is such that when the opening $e$ registers with the center of the photographic lens the ends of the plate E will completely shut off the transmission of light through the two stereoscopic lenses, and when the plate is slid into position to bring the opening $e'$ to admit light through the stereoscopic lenses D the opposite end of the plate E will have been withdrawn from the stereoscopic lens D' to permit the light to pass through it, and at the same time the portion of the plate E adjacent to the opening $e$ will have completely shut off the transmission of light through the photographic lens. The plate E is manipulated by means of a laterally-projecting stud $e^2$, provided with a forwardly-extending thumb-piece $e^3$, adapted to travel along the narrow slot $a$ in the front plate A.

According to the arrangement which I have shown to illustrate my invention, when the plate E is in the position shown in Fig. 1 the photographic lens at the center is permitted to operate, and when the plate is slid toward the left the photographic lens will be thrown out of operation and the pair of stereoscopic lenses will be brought into operation.

The means for making the exposures, whether instantaneous or for a longer time, consist of the following parts: Two thin sliding plates or strips F and F' are mounted to overlap each other and extend along the centers of the three lenses to the rear of the front members of each and just back of the front plate A. These plates F F' are each provided with three openings, shown in the present instance square, those in the plate F being denoted by $f f' f^2$ and those in the plate F' by $f^3 f^4 f^5$. The openings $f$ and $f^2$ in the plate F and $f^3 f^5$ in the plate F' are for the purpose of making the exposures with the pair of stereoscopic lenses, while the openings $f'$ and $f^4$ are for the purpose of making the exposures with the photographic lens. The openings in the two sliding plates or strips are so arranged with respect to one another that as the two plates are slid toward one another the extent of their inward stroke the several sets of openings will gradually approach a position where they will register with each other and will then pass on to a position completely out of register, so that there will be a complete exposure and then a closure of the lenses. In the same manner when the plates F F' are drawn away from each other the full limit of their outward stroke the holes will again register with each other and will then be completely thrown out of register, so that there will be a complete exposure and closure during the inward stroke.

The plates or strips F F' are reciprocated by means of levers pivoted at G G' and having their lower arms $g$ $g'$ connected by links H H' with projections on the ends of the plates F F'. The upper arms $g^2$ $g^3$ of the levers have a cylinder secured to the end of one arm and a piston secured to the end of the other arm. In the present instance I have shown the cylinder I pivotally connected at one end to the arm $g^2$ and the piston $i$ connected by a piston-rod $i'$ with the end of the arm $g^3$. The cylinder I has a cylindrical sleeve I' surrounding it and fitted with a close sliding fit to it, so as to permit the latter I' to be rocked a quarter of a revolution, more or less, on the exterior of the cylinder I. The cylindrical sleeve I' is provided with a tubular projection $i^2$ for the attachment thereto of an air-bulb of any well-known or approved form, and at the base of the tubular projection $i^2$ is an opening in the sleeve I', which, when the latter is turned into a certain position, registers with a corresponding opening $i^3$ in the wall of the cylinder I, as shown in Fig. 1. An opening $i^4$ in the cylinder I, when the cylinder is so turned, also registers with an opening $i^5$ in the sleeve upon the opposite side of the piston $i$ and the opening I$^3$. The cylindrical sleeve I' has also a series of openings in it which, when it is turned on the cylinder I to close the openings $i^3$ and $i^4$, will bring said openings in the sleeve I' to register with the series of openings $i^6$ in the cylinder I. The particular function of these openings will appear later on.

The levers, pivoted at G and G', are further provided with sector-arms $g^4$ $g^5$, provided on their adjacent ends with rack-teeth in position to engage with each other, so as to cause the levers to move simultaneously in opposite directions no matter to which of the levers power may be applied.

An operating-spring K is pivotally secured to the plate A at $k$, and its free end is connected with a link $k'$ with one of the sector-arms $g^4$ or $g^5$ of the operating-levers, in the present instance with the sector-arm $g^4$. A handle L for operating the spring K is connected firmly at one end of the spring K near the point where the spring is pivoted, the free end of the handle L extending through a socket in a spring-clip M, arranged to slide along a bar N when loosened and to be clamped to the bar N in the desired adjustment. A thumb-screw $m$ is employed to tighten the clip M about the bar N to set the spring. A second spring-clip M' is mounted on the bar for the purpose of limiting the sliding movement of the clamp thereon. The bar N is also itself made adjustable to bring its head $n$ nearer to or farther away from its support by means of a third spring-clamp M$^2$.

A pair of catch-pawls O O' are pivoted to the front plate A at $o$ and $o'$ and provided with operating-arms $o^2$ $o^3$, which operating-arms are connected, the one with a cylinder and the other with a piston arranged to slide within the cylinder. In the present instance I have shown the arm $o^2$ connected with the cylinder P by a rod $p$, and I have shown the arm $o^3$ connected by a rod $p'$ with the piston $p^2$ within the cylinder P. The piston $p^2$ is in the present instance a cylindrical tube, having its end toward the rod $p$ open and its opposite end closed. The cylinder P is provided with a nipple $p^3$ for the purpose of attaching thereto an air-bulb of any well-known or approved form, and the end of the cylinder P, where the piston $p^2$ enters, is provided with a spring-clamp Q for the purpose of compressing the thin wall of the cylinder into frictional contact with the piston when it is desired to rock the catch-pawls out of operative position.

The catch-pawls O O' are so located with respect to the ends of the arms $g$ $g'$ of the operating-levers that when the levers are swung in one direction one of the pawls will engage the end of one of the arms and hold the levers in that position, and when the levers are swung in the opposite direction the other pawl will engage the end of the other of the arms and hold them in that position. No matter which of the pawls O O' is holding the levers that pawl will be released immediately upon the movement of the piston $p^2$ outwardly within the cylinder P for the reason that the cylinder P and its piston $p^2$ are free to move, each relatively to the other.

The catch-pawls O O' are caused to normally return to and remain in a position to catch the ends of the levers in any well-known or approved manner.

The diaphragms for admitting the light to the lenses are located between the front plate A and an intermediate plate A', between it and the backing B. The diaphragms for the stereoscopic lenses are rotary disks R R', provided with a series of perforations gradually diminishing in size, as is common, and the diaphragm for the photographic lens is denoted by R$^2$, and, like the diaphragms R R', is also provided with a series of openings gradually varying in size. The disks R R' are geared to the disk $R^2$, so as to rotate simultaneously with it, and the openings in the disks R R' are so arranged with respect to the disk $R^2$ that the same-sized openings will always appear at the same time in the two stereoscopic lenses. In the present instance I have made the arrangement so that the two larger openings will appear at the stereoscopic lenses at the same time that the largest opening in the diaphragm $R^2$ appears in the photographic lens. While I prefer this arrangement, it is not absolutely necessary. The disk $R^2$ is operated by means of a pinion $r$, geared therewith and controlled by a thumb-piece $r'$ in front of the plate A. In connection with the diaphragms R, R', and $R^2$, I have shown a dial on the disk $R^2$, consisting in the present instance of the numerals from "0" up to "6," inclusive, and the arrangement is such that the "0" will appear in front of the peep-hole $a'$ in the front plate A when the largest-sized openings in the diaphragms are in alinement with the several lenses, the figure "1" appearing in front of the peep-hole $a'$ when next to the largest-sized openings are in alinement with the lenses, and so on, the figure "6" appearing in front of the peep-hole when the smallest-sized openings are in alinement with the lenses. This arrangement of the dial makes it feasible for the operator to bring a larger opening in alinement with the lenses for the purpose of focusing the object to be taken, and to then rotate the diaphragms so as to bring the very small openings in alinement with the lenses after the focusing has been secured by simply watching the numerals of the dial-plate in front of the peep-hole $a'$.

In operation suppose it be required to take an instantaneous photograph. The slide E will be moved into the position shown in Fig. 1, shutting off the stereoscopic lenses and opening the photographic lens. The handle L for setting the spring K will then be moved in a direction to exert tension upon the spring K to throw the operating-levers either toward or away from each other, as the case may be. In the form shown in Fig. 1 it is moved in a direction so that the spring K will tend to spring the operating-levers toward each other at their lower ends the moment they are released. One of them, the arm $g$, is held by the catch-pawl O, and it, because of the connecting-sectors $g^4$ $g^5$, holds the other lever from moving. The moment the catch-pawl O is released from the arm $g$ the two levers will simultaneously move toward each other at their lower ends, and will thereby slide the plates F F' toward each other, bringing the openings $f'$ $f^4$ in the plates for an instant in position to register and immediately throwing them out of register, thereby making the instantaneous exposure. The catch-pawl O is operated by a sudden pressure of air from the air-bulb within the cylinder P, which tends to force the cylinder away from the piston, thereby rocking the catch-pawl O and releasing the operating-lever. In the same manner if the levers were held with their lower ends toward one another by the catch-pawl O' they would be tripped by the pressure of air within the cylinder P forcing the piston $P^2$ outwardly.

When so operated, the cylinder I may be utilized as a dash-pot or air-cushion by simply turning the outer cylindrical sleeve I' so as to close the openings $i^3$ and $i^4$.

The operation of the stereoscopic lenses is the same as that of the photographic lens, the only requirement being that the slide E be slid to the left, so as to shut off the photographic lens and open the stereoscopic lenses.

In case it is desired to make an exposure of longer duration than what is commonly known as "instantaneous," the catch-pawls O O' may be locked out of operative position by drawing the piston $p^2$ out of the cylinder P to the limit of its movement and then clamping it in that position by the spring-clip Q, then loosening the spring-clamp M so that the handle L of the spring may slide freely on the bar N, and turning the sleeve I' into the position with respect to the cylinder I shown in Fig. 1. By injecting air-pressure into the cylinder I the upper ends of the operating-levers will be thrown apart and the slides F F' slid toward one another a distance sufficient to bring the openings $f'$ $f^4$ to register, or, if the stereoscopic lenses are to be used, to bring the respective openings in the slides for those lenses to register, and after retaining the slides F F' in this position the desired length of time the withdrawal of the air from the cylinder I will return the operating-levers and hence the slides F F' to again shut off the lenses. The limit of the movement of the slides F F' toward each other to accomplish this is determined by a latch S on the front plate A, which may be thrown down into position to engage a stud $s$ on the end of the slide F'.

What I claim is—

1. A lens-plate for a camera, provided with photographic and stereoscopic lenses, means for bringing the one or the other of the lenses into operation at pleasure, and a diaphragm for each lens, the said diaphragms for the different lenses being under the control of a common operating device, substantially as set forth.

2. The combination with a camera-lens, of oppositely-moving slides for making exposures, a pair of levers for operating the slides, a spring for actuating the levers, means for setting the spring to throw the lever in either of two opposite directions, catch-pawls for locking the levers at the ends of their opposite movements and a tripping mechanism, substantially as set forth.

3. The combination with the slide-operating levers, their actuating-spring and means for setting the spring, of catch-pawls for holding the levers at the limits of the strokes and an air-cylinder and piston, the one connected with one of the pawls and the other with the other of the pawls, the air-cylinder and piston being supported to move relatively to each other, substantially as set forth.

4. The combination with the slide-operating levers and their actuating-spring, of a handle connected with the spring for setting it, a bar, means for clamping the handle to the bar, means for holding the lever against the tension of the spring and means for tripping the levers, substantially as set forth.

5. The combination with the slide-operating levers, of a combined dash-pot and operating-cylinder, consisting of a cylinder and a piston, one connected to one of the levers and the other to the other of the levers, and a movable sleeve fitted to the cylinder and provided with openings adapted to be brought into and moved out of register with openings in the cylinder, substantially as set forth.

6. The combination with the different lenses and means for making the exposures, of the perforated diaphragms for the different lenses all connected to move together, and a dial for indicating the different-sized openings in the diaphragms which are in alinement with the lenses, substantially as set forth.

VERNON ROYLE.

Witnesses:
    IRENE B. DECKER,
    FREDK. HAYNES.